(12) United States Patent
Ives et al.

(10) Patent No.: US 7,457,457 B2
(45) Date of Patent: Nov. 25, 2008

(54) APPARATUS AND METHOD FOR GENERATING A THREE-DIMENSIONAL REPRESENTATION FROM A TWO-DIMENSIONAL IMAGE

(75) Inventors: John D. Ives, Clifton, NJ (US); Timothy C. Parr, Ridgewood, NJ (US)

(73) Assignee: Cyberextruder.Com, Inc., Newark, NJ (US)

( * ) Notice: Subject to any disclaimer, the term of this patent is extended or adjusted under 35 U.S.C. 154(b) by 893 days.

(21) Appl. No.: 10/221,229

(22) PCT Filed: Mar. 8, 2001

(86) PCT No.: PCT/US01/07759

§ 371 (c)(1),
(2), (4) Date: Jun. 16, 2003

(87) PCT Pub. No.: WO02/095677

PCT Pub. Date: Nov. 28, 2002

(65) Prior Publication Data

US 2004/0041804 A1    Mar. 4, 2004

Related U.S. Application Data

(60) Provisional application No. 60/187,742, filed on Mar. 8, 2000.

(51) Int. Cl.
*G06K 9/62* (2006.01)
*G06K 9/00* (2006.01)
*G06T 15/00* (2006.01)

(52) U.S. Cl. .................. 382/155; 382/115; 382/118; 345/419

(58) Field of Classification Search ......... 382/115–118, 382/103, 155, 215, 282, 285; 345/6, 419, 345/420, 427, 492, 506, 562, 652–654, 663–665, 345/678–680; 348/267, 824
See application file for complete search history.

(56) References Cited

U.S. PATENT DOCUMENTS

| | | | |
|---|---|---|---|
| 5,280,305 A * | 1/1994 | Monroe et al. | 347/129 |
| 6,044,168 A * | 3/2000 | Tuceryan et al. | 382/118 |
| 6,047,078 A * | 4/2000 | Kang | 382/107 |
| 6,072,894 A * | 6/2000 | Payne | 382/118 |
| 6,775,397 B1 * | 8/2004 | Hamalainen | 382/118 |

(Continued)

OTHER PUBLICATIONS

Aizawa, K., Model-Based Image Coding: Advanced Video Coding Techniques for Very Low Bit-Rate Applications, Proceedings of the IEEE, vol. 83, No. 2, Feb. 1995, pp. 259-271.

(Continued)

*Primary Examiner*—Abolfazl Tabatabai
(74) *Attorney, Agent, or Firm*—Sonnenschein Nath & Rosenthal LLP

(57) ABSTRACT

An apparatus for generating a three-dimensional representation from a two-dimensional image has a memory device for storing information for processing a two-dimensional image and for generating a three-dimensional image from the two-dimensional image, a processing device for processing a digital representation of an image by generating a two-dimensional image from the digital representation and by generating a three-dimensional image corresponding to the two-dimensional image, and an output device for outputting a three-dimensional image and a digital signal representation of the three-dimensional image. An associated method is also disclosed.

23 Claims, 2 Drawing Sheets

U.S. PATENT DOCUMENTS 6,940,545 B1 * 9/2005 Ray et al. ............... 348/222.1
2004/0041804 A1 3/2004 Ives

OTHER PUBLICATIONS

Edwards, G.J. et al., Face recognition using statistical models, IEE Colloq Dig; IEEE Colloquium (Digest) Mar. 10, 1997, IEE, Stevenage, Engl. No. 074, Mar. 10, 1997 p. 2/1-2/6.

Lanitis A. et al., A unified approach to coding and interpreting face images. Computer Vision, 1995, Proceedings, Fifth International Conference on Cambridge, MA, USA Jun. 20-23, 1995, Los Alamitos, CA, USA, IEEE, Comput. Soc. US, Jun 20, 1995, pp. 368-373.

Li-An T. et al., Automatic construction of 3D human face models based on 3D Images, Proceedings of the International Conference on Image Processing (ICIP) Lausanne, Sep. 16-19, 1996, New York, IEEE, US, vol. 1, Sep. 16, 1996, pp. 467-470.

Park, M.C. et al, Analysis and synthesis of 3-D face image sequence based on model-based mage coding scheme with an Internet browser, Image Processing, 1999. ICIP 99, Proceedings. 1999 International Conference On Kobe, Japan Oct. 24-28, 1999, Piscatway, NJ, USA, IEEE, US, vol. 4, Oct. 24, 1999, pp. 207-211.

Suhuai, L. et al., Automatic human face modeling in model-based facial image coding, Intelligent Information Systems, 1996, Australian and New Zealand Conference on Adelaide, SA, Australia Nov. 18-20, 1996, New York, New York, USA, IEEE, US Nov. 18, 1996, pp. 174-177.

International Search Report and Written Opinion dated Sep. 28, 2006, Int'l. Application No. PCT/US05/33620, Int'l. Filing Date Sep. 19, 2005.

Sang-Jean Lee et al., Face Detection and Recognition Using PCA, 1999 IEEE Tencon.

* cited by examiner

APPARATUS AND METHOD FOR GENERATING A THREE-DIMENSIONAL REPRESENTATION FROM A TWO-DIMENSIONAL IMAGE

CROSS-REFERENCE TO RELATED APPLICATIONS

This application is related to, incorporates by reference, and claims priority to International Application PCT/US01/07759, filed on Mar. 8, 2001 which in turn claims priority to U.S. Provisional Application No. 60/187,742, filed on Mar. 8, 2000.

The present invention pertains to an apparatus and a method for generating and/or for obtaining a three-dimensional representation from a two-dimensional image and, in particular, to an apparatus and a method for generating a three-dimensional image from a two-dimensional image.

SUMMARY OF THE INVENTION

The apparatus includes a central processing computer, a network computer, and/or a server computer, and any number of computers, remote computers, client computers and/or any other communication devices, for facilitating communication with the respective central processing computer, network computer and/or server computer. Each of the respective computers and/or communication devices can include any necessary and/or desired hardware, peripheral devices, and/or software, for performing any of the respective processing routines and/or functionally described herein.

The apparatus and method of the present invention can be utilized to generate three-dimensional images from any type of two-dimensional images and/or from any other images and/or representations of images, digital and/or otherwise. In this regard, the scope of the present invention is not to be construed to be limited by and/or to any specific examples and/or applications which are described herein.

DETAILED DESCRIPTION OF THE INVENTION

Table of Contents:
1) Introduction
2) Algorithm Overview
   a) Principle Component Analysis
   b) Building a 2D Face Model
   c) Finding Faces in 2D
   d) Converting 2D to 3D
3) Data 1) Introduction:
This document describes a technique that can be used to obtain a 3D representation of the human face from a 2D image. The requirements of such a technique are briefly outlined as data inputs and data outputs. The data input requirements are broadly described as a 2D digital image of a human face, more detailed requirements (such as image resolution, focus etc.) are given in subsequent sections. The data output requirements can be loosely described as faithful 3D representation of a human face incorporating the original 2D image as a texture map. A more rigorous definition of the phrase 'faithful representation' is given in subsequent sections in the form of assumed market requirements. For example, a low polygon count low accuracy requirement for the games market or a high polygon count high accuracy requirement for the mug shot market. These requirements impact on all aspects of the algorithm and its application. However, the underlying technique remains unchanged. Many different medical applications have benefited from the use of statistical modelling algorithms, from the location and tracking of the ventricles in the human heart from a sequence of ultrasonic images to 3D modelling of brain sulci. Section 4 provides 3 references describing some of the applications of the technique. For more references (and more details) the reader is referred to the Wolfson Image Analysis Unit web site which can be found at: www.wiau.man.ac.uk.

2) Algorithm Overview:
The algorithm is based upon a multivariate mathematical modelling technique called principal component analysis (PCA). PCA provides a compact statistical representation of the variation in an n-dimensional data set.

Figure 1:
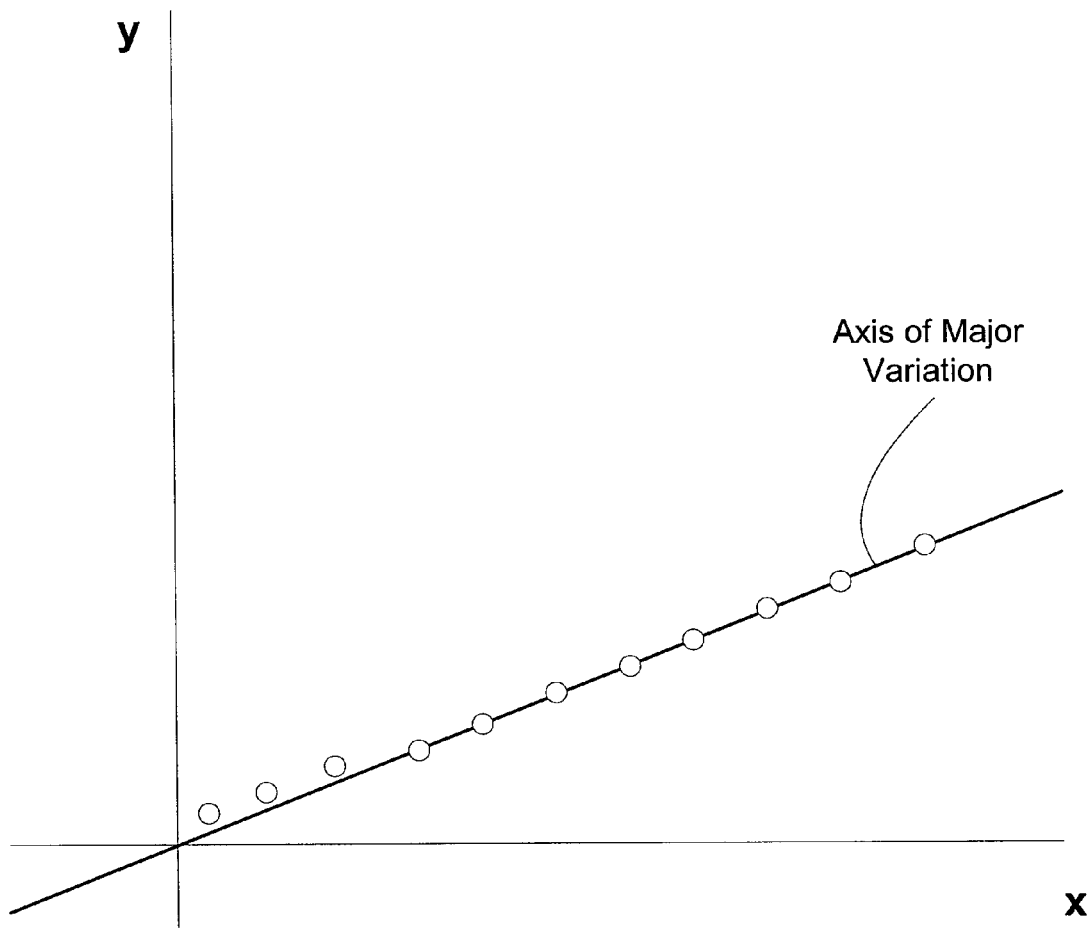
FIG. 1 is a graph illustrating principle component analysis.
Figure 2:
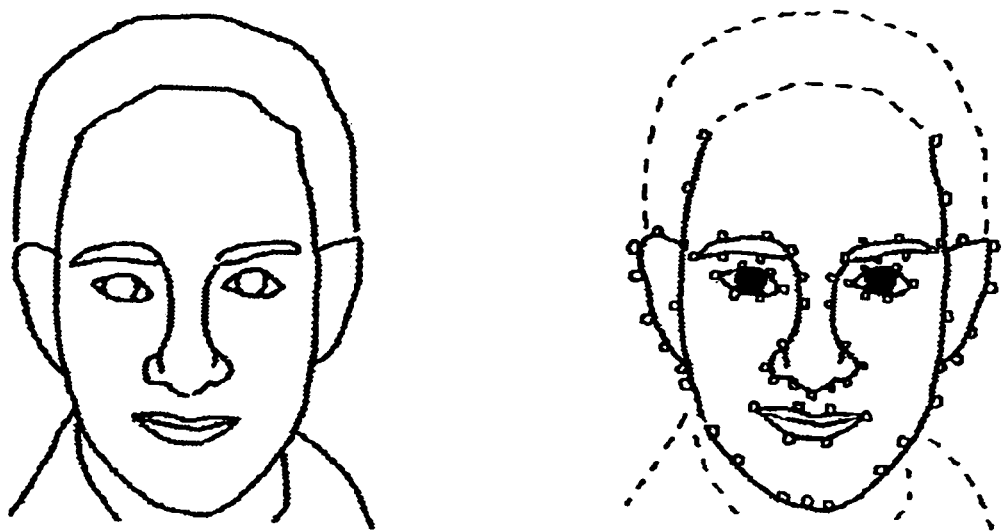
FIG. 2 is a drawing illustrating annotation of a two dimensional image.

2a) Principal Component Analysis:
A simple illustration of PCA can be seen in FIG. 1. The data set consists of many data points, each point is represented by two variables (x and y dimensions). However, the graph demonstrates how each data point can be represented by a single variable and what is termed a basis change. The basis change effectively re-orients the axes so that one axis lies along the line of most variation (in this case the positive diagonal) and the other axes lies along the line of the next greatest variation (in this case the negative diagonal, with zero variation). The resulting effect of this basis change allows each data point to be represented by a single variable describing the distance along the positive diagonal (i.e. the axis of most variation). Thus, a more compact representation is achieved.

The application of PCA to data representing real world variables (such as the 2D position of eyes in an image of a human face) obtained from a statistically significant training set results in a more compact representation. Additionally, the statistically modelled axes often represent more meaningful modes of variation. Taking the example of the human face, a simplistic illustration can be visualised as the first mode of variation describing the aspect ratio of human faces, whilst the second may describe the size of the mouth etc.

2b) Building a 2D Face Model:
The 2D face model is constructed from an annotated training set of 2D images. An example of an annotated 2D image is given in FIG. 1.

Each point in the annotation represents 2 variables (x position and y position) and each annotation contains no points. Thus, a single observation vector containing 2n variables describes the face shape. To construct a statistical model of face shape the training set of observation vectors is first normalised to remove scale and pose. That, is, each face shape is rotated (pose) and scaled with respect to either the mean (average) shape or with respect to the first shape in the training set. Model building then proceeds by constructing the covariance matrix from the training set of normalised observation vectors.

Eigen analysis is performed on the covariance matrix to extract a set of orthogonal eigen vectors that describe the basis change from 2D face space to a set of principal components. The dimensionality of the matrix of eigen vectors (P) can be significantly reduced by ordering the column eigen vectors in terms of decreasing eigen values. The eigen values are equal to the variance in each orthogonal axis described by the eigen vectors. In real data sets the number of eigen values required to describe 90-95% of the training data set variation can be as small as ten. Thus for an observation vector with 200 elements (100 points) the required number of variables (also known as principal components) to describe a face shape has been reduced by a factor of 20, i.e. a more compact representation of face shape. Additionally, each of the principal components represents a mode of variation that describes a more meaningful variation.

$$x_i = Pb_i + m \quad \text{Eqn 1}$$

Where,
   $x_i$=i th observation vector, i.e. the annotation points
   P=orthogonal matrix of eigen vectors
   $b_i$=i th reduced dimensionality vector of principal components
   m=means observation vector, i.e. the average face annotation $$b_i = P^T(x_i - m) \quad \text{Eqn 2}$$

Using equation 1 a vector of principal components can be converted into an observation vector and hence a face shape. As matrix P is orthogonal equation 2 can be used to convert an observation vector into a vector of principal components.

2c) Finding Faces in 2D:

Once a mathematical model representing the human face has been training using a statistically significant (for example a realistic cross-section, adequately representing the variation of human faces) training set of 2D images of faces, it can be used to find the face in a 2D image. Thus, given a new image of a face (i.e. not in the training set) the relevant parts of the face (e.g. eyes, chin, etc) can be automatically found. To find the face an iterative search strategy is used. The mean observation vector (m) is used to provide and initial estimate of the location of the face in the 2D image. Subsequently, local searches for relevant features (a feature can simply be an edge on which an annotation point lies) at each annotation point are performed and used to estimate a new position for the face annotation in the image. At each iteration the model is used to best estimate the most realistic position of the face annotation. The best estimate is obtained by calculating the b vector of principal components from the new face annotation (eqn. 2). The b vector is then used to obtain the best annotation estimate (x) (eqn. 1). The iterative process continues until the values in the b vector are approximately constant The model, therefore, constrains the search to be statistically realistic until the face is found.

The speed of the search strategy can be improved by utilising a multi-resolution approach. In this case the image is smoothed (gaussian smoothing) and sub sampled by a factor of two, thus producing an image half the size of the original. The sub-sampled image is smoothed and again sub sampled resulting in an image one quarter the size of the original. Th smoothing and sub-sampling continues to produced a pyramid of images. The positions of the annotations are adjusted (by factors of two) to produce annotations at each image resolution (level in the pyramid). A PCA model is built at each resolution level. The face is found in a new image as follows. First build the image pyramid from the original image. Then apply the lowest resolution model to the lowest resolution image, i.e. find the face in the low resolution image. The resulting found face position is used as the initial estimate to start the search in the next resolution. This process continues until the face is found at the highest resolution (i.e. the original image).

2d) Converting 2D to 3D:

The construction of a 3D representation of the face can be achieved in two ways, both of which are driven by output requirements. A simple generic 3D representation can be texture mapped from the 2D face image after the face has been found using the technique briefly illustrated above. This may be adequate for some markets (such as the games market, where faithful 3D reconstruction may not be a requirement). The second technique requires building a 3D statistical model of human faces in exactly the same way as the 2D face model but this time using 3D data. For the 3D case each point is described by 3 variables (x,y,z). In this way the 2D face can be found as above and used as input to the 3D face model, which can then reconstruct the most realistic estimate of the 3D face based n the 2D face. How realistic the resulting 3D model is will depend on the statistical significance in the training sets (2D and 3D) and the parametric representation (for example, representing the lips with 2 lines or 3). Theory suggests that a faithful representation can always b achieved if the training sets contain the variability present in the populace. However, in practice this will have to be quantified via a technique such as leave-one-out testing, as one can never assume that the variability has been adequately captured. (As an aside I have worked with researchers that successfully produced 2D face models that were capable of finding faces in new (unseen) images. The models were built from databases containing approximately 50-100 faces).

3) Data:

The 2D face image must have a resolution that can faithfully represent facial features. It has been shown that an image from a standard digital camera or an image scanned via a standard flat-bed document scanner provides sufficient resolution to faithfully represent the relevant facial features. It may be possible to reconstruct the face from a low resolution 2D image, however, this remains to be tested.

The face image must be a front facing image. It is not crucial to position the face in the centre of the image, however, for successful texture mapping the whole of the face must be present in the image. The technique can always provide a best estimate of the position of the facial features, however, the accuracy of their location will be adversely affected by the focus of the image. Badly focused images can lead to incorrect feature location and will result in a blurred texture map.

The number of 3D faces in the training set is the significant factor effecting the faithful representation of the 3D face. If a relatively low faithful representation is required the number of 3D faces in the training set may be as low as 30. Again, this remains to be determined. To produce and apply models that are adequate for markets requiring a highly faithful 3D representation, the training sets must be large enough to capture the variability of the human face. In pursuing these markets, bearing in mind the extra resource required to produce the models, the same models can be used for all markets.

The apparatus and method of the present invention can process financial transactions and/or financial transaction information. Financial transactions can be processed in conjunction with the image processing routine described herein in order to facilitate the utilization of the present invention in a commercial environment.

5) REFERENCES

Applicant hereby incorporates by reference herein the subject matter and Teachings of the following references.

1) Cootes et al: "Training models of shape from sets of examples", Proc: British Machine Vision Conference, Springer-Verlag, 1992 pp 9-18.
2) Cootes et al: "Active Shape Models—Smart Snakes", in Proc: British Machine Vision Conference, Springer-Verlag, 1992, pp. 266-275.
3) Lanitis et al: "A unified approach to coding and interpreting face images", Proc: ICCV 1995, pp. 368-373.

What is claimed is:

1. A method for generating a three-dimensional face representation, comprising:
   finding a face image in a two-dimensional image using a two-dimensional face model built from a two-dimensional training set, wherein finding the face image comprises:
   annotating the two-dimensional face model with a plurality of model feature annotations;
   using a mean observation vector to estimate a face image location;
   using a feature search specific to one of the plurality of model feature annotations to estimate a first feature location; and using at least the face image location and the first feature location to find the face image; and
   using a three-dimensional face model built from a three-dimensional training set to generate the three-dimensional face representation from the face image.

2. The method of claim 1, wherein finding the face image comprises iteratively estimating a face image location based on an initial estimate of the face image location and a new estimate of a location of one of a plurality of model feature annotations.

3. The method of claim 1, wherein finding the face image comprises:
   using a feature search specific to another of the plurality of model feature annotations to estimate a second feature location; and
   using at least the face image location, the first feature location, and the second feature location to find the face image.

4. The method of claim 1, comprising building the two-dimensional face model from the two-dimensional training set.

5. The method of claim 4, wherein building the two-dimensional face model from the two-dimensional training set comprises:
   constructing observation vectors from a plurality of manually annotated feature annotations;
   normalizing the observation vectors;
   constructing a covariance matrix from the normalized observation vectors; and
performing an eigen analysis on the covariance matrix to build the two-dimensional face model.

6. The method of claim 1 wherein using a three-dimensional face model comprises using a three-dimensional face model built from three-dimensional training sets each comprising sets of three modeled coordinate variables.

7. The method of claim 1, comprising building the three-dimensional face model from three-dimensional training sets each comprising sets of three modeled coordinate variables.

8. The method of claim 1, further comprising processing a financial transaction in conjunction with the generating a three-dimensional face representation.

9. The method of claim 1, comprising:
   receiving the two-dimensional image at a server from a remote computer; and
   transmitting the three-dimensional face representation from the server to the remote computer.

10. A method for generating a three-dimensional face representation, comprising:
    building a two-dimensional face model from built from a two-dimensional training set, wherein finding the face image comprises:
    annotating the two-dimensional face model with a plurality of model feature annotations;
    using a mean observation vector to estimate a face image location;
    using a feature search specific to one of the plurality of model feature annotations to estimate a first feature location; and
    using at least the face image location and the first feature location to find the face image;
    automatically finding a face image in a two-dimensional image using the two-dimensional face model; and
    using a three-dimensional face model built from a three-dimensional training set to generate the three-dimensional face representation from the face image.

11. The method of claim 10, wherein finding the face image comprises:
    using a feature search specific to another of the plurality of model feature annotations to estimate a second feature location; and
    using at least the face image location, the first feature location, and the second feature location to find the face image.

12. The method of claim 10, wherein building the two-dimensional face model from the two-dimensional training set comprises;
    constructing observation vectors from a plurality of manually annotated feature annotations;
    normalizing the observation vectors;
    constructing a covariance matrix from the normalized observation vectors; and
    performing an eigen analysis on the covariance matrix to build the two-dimensional face model.

13. The method of claim 10, wherein using a three-dimensional face model comprises using a three-dimensional face model built from three-dimensional training sets each comprising sets of three modeled coordinate variables.

14. The method of claim 13, comprising building the three-dimensional face model from three-dimensional training sets each comprising sets of three modeled coordinate variables.

15. The method of claim 10, further comprising processing a financial transaction in conjunction with the generating a three-dimensional face representation.

16. An apparatus for generating a three-dimensional face representation, comprising:
    a memory that at least temporarily stores a two-dimensional face model built from a two-dimensional training set and a three dimensional face model built from a three-dimensional training set;
    at least one processor that automatically finds a face image in a two-dimensional image using the two-dimensional face model and generates the three-dimensional face representation from the face image using the three-dimensional face model, wherein the at least one processor annotates the two-dimensional face model with a plurality of model feature annotations, estimates a face image location by using at least one mean observation vector, estimates a first feature location by using a feature search specific to one of the plurality of model feature annotations, and finds the face image by using at least the face image location and the first feature location.

17. The apparatus if claim 16, wherein the at least one processor:

estimates a second feature location by using a feature search specific to another of the plurality of model feature annotations; and finds the face image by using at least the face image location, the first location, and the second feature location.

18. The apparatus of claim 16, wherein the one of the additional processor and the at least one processor;

constructs observation vectors from a plurality of manually annotated feature annotations;

normalizes the observation vectors;

constructs a covariance matrix from the normalized observation vectors; and builds the two-dimensional face model by performing an eigen analysis on the covariance matrix.

19. The apparatus of claim 16, wherein the three-dimensional model is built from three-dimensional training sets and each three-dimensional training set comprises sets of three modeled coordinate variables.

20. The apparatus of claim 19, wherein one of an additional processor and the at least one processor builds the three-dimensional face model from three-dimensional training sets and each three-dimensional training set comprises sets of three modeled coordinate variables.

21. The apparatus of claim 16, wherein said processor processes a financial transaction.

22. A method for generating a three-dimensional face representation, comprising:

building a two-dimensional face model from a two-dimensional training set;

automatically finding a face image in a two-dimensional image using the two-dimensional face model; and using a three-dimensional face model built from a three-dimensional training set to generate the three-dimensional face representation from the face image;

wherein building the two-dimensional face model from the two-dimensional training set comprises:

(i) constructing observation vectors from a plurality of manually annotated feature annotations;

(ii) normalizing the observation vectors;

(iii) constructing a covariance matrix from the normalized observation vectors; and (iv) performing an eigen analysis on the covariance matrix to build the two-dimensional face model.

23. A method for generating a three-dimensional face representation, comprising:

building a two-dimensional face model from a two-dimensional training set;

automatically finding a face image in a two-dimensional image using the two dimensional face model; and using a three-dimensional face model built from a three-dimensional training set to generate the three-dimensional face representation from the face image;

wherein automatically finding the face image in the two-dimensional image using the two-dimensional face model comprises:

(i) annotating the two-dimensional face model with a plurality of model feature annotations;

(ii) using a mean observation vector to estimate a face image location;

(iii) using a feature search specific to one of the plurality of model feature annotations to estimate a first feature location;

(iv) using at least the face image location and the first feature location to find the face image; and (v) using a three-dimensional face model built from a three-dimensional training set to generate the three-dimensional face representation from the face image.

* * * * *